July 7, 1964

T. W. BROWN 3,140,332

INJECTION MOLDING METHOD AND APPARATUS

Filed March 1, 1961

INVENTOR.
THOMAS BROWN
BY Emery, Booth, Miller
+ Townsend

ATTORNEYS

United States Patent Office 3,140,332
Patented July 7, 1964

3,140,332
INJECTION MOLDING METHOD AND APPARATUS
Thomas W. Brown, Ashland, Mass., assignor to Lombard Industries, Inc., Ashland, Mass.
Filed Mar. 1, 1961, Ser. No. 92,655
7 Claims. (Cl. 264—329)

This invention relates to injection molding and more particularly to novel method and apparatus therefor.

In injection molding a body of hard or solid material is first reduced or converted to a state in which it may be forced into the mold. More simply it is plasticized, or made capable of flowing.

With materials such as are commonly employed for plastic molding, this plasticizing requires the subjecting of the material to very high pressures, on the order of, say, 10,000 to 30,000 pounds per square inch.

The plastic materials differ in various of their properties. They may be supplied in several particle sizes, and also in different forms, as compound and dry blend, whereby they vary in extrusion behaviour, particularly in respect to heat. Thus they may differ in their prior heat history, in their ability to absorb conducted heat, and in their tendency to develop frictional heat.

The suitable softening of at least some plastic stock requires heating, or further heating, in excess of that generated by the compressing and shearing action of the injection apparatus. Hence in injection molding it is commonly required to employ heaters which are controlled to supplement or at least prevent loss of the heat of the material.

Of course high mold output avails nothing without good product quality. This requires the elimination of unplasticized resin particles or "fish eyes"; a good surface appearance in respect also to the absence of degrading; and minimum porosity, or the ejecting of occluded air and water.

The obtaining of good product quality in these and other respects is complicated by various factors.

Some materials, such as polyvinyl chloride dry blends, must be extruded close to the decomposition temperature, if the desired physical properties are to be attained in the product.

At the same time the best polyvinyl chloride materials are those which have been exposed to the least time integral of temperature, in the sense at least that the longer heating which may be required with less accurate or reliable control of the plasticizing may impair the ability of the stabilizers to protect the finished product from heat.

Again, an extruder affording high enough shearing action for a good extrudate may also yield excessive temperatures such as wil burn or blister the stock. Further, some materials, such as nylon, have a steep viscosity-temperature cure whereby they become fluid rather sharply above certain temperatures, and so will on excessive heating cause objectionable dripping or "drooling."

Still further, certain physical characteristics such as the "fish eyes" and the porosity, may be differently and even oppositely influenced by operating conditions, such as the position of the melt zone, and the degree of back pressure.

Compounded with the foregoing problems as to temperature is the necessity for measuring or metering the volume of the injection cylinder charge or "shot," to obtain accurate filling of the mold. This determination of the volume involves in turn control of the pressure of the body of plastic material which is to be forced or rammed into the mold.

Accordingly, there is provided by this invention a plasticizing method and apparatus distinguished by the coordinated control of the temperature, pressure and volume of the injection cylinder.

It will be appreciated also that efficient or economic operation requires that the desired product characteristics be achieved with repeatability, or the maintenance without interruption of the operating cycle of the machine. For once the cycle is disrupted it is difficult to re-establish, and this has heretofore resulted in costly down time of the molding unit, with attendant forced idleness of the operating personnel.

Hence a further object of the injection molding as here concerned is to attain the pressure, volume and temperature values in cylically definite and reproducible manner. Stated more particularly the invention object is to establish the plasticizing conditions with greater accuracy and uniformity than under the prior practice, and thereby to attain higher repeatability of the operating cycle, and also better quality and fewer defects in the molded product.

The plasticizing of the material is most efficiently carried out under conditions of maximum surface exposure, as for more uniform and complete heating of the material. Also, and as above noted, the plastic material is helpfully physically worked in the preparing, with the mechanical energy which that consumes being realized as additional heat in the material.

Accordingly, for the preparation of the plastic material to be injected into the mold there is preferably and herein employed a rotating-reciprocating screw type apparatus, providing a moving as distinguished from a static supply passage, in the form of a spiral cut through which the plastic material is mechanically worked, in being advanced by rotation of the screw. And there are utilized heating elements which are mounted about and along the length of the screw, as well as about the chamber ahead of it, which may be closely controlled and coordinated with the screw rate and the plastic material for uniform heating to the precise level desired.

While it is greatly advantaged in the foregoing respects the screw type apparatus has conventionally required some valve means by which are alternately closed and opened to the mold the plastic material chambers in which for flowing are built up the very high (10,000-30,000 p.s.i.) injection pressures. These valves are difficult to control, and they are found to leak, usually at the point of egress of the mechanical operating member from the chamber. The valve assemblies are likely also to trap or stagnate small portions of the plastic material that may overheat or burn, and so become deteriorated or degraded. The burnt portion may be visually detectable as a discoloration in the molded product, or it may be reflected in the end product as a structural weakness not detectable by the usual quality check.

In accordance with this invention the cylinder valve means and the problems flowing from their use are entirely done away with, eliminating one of the things that can go wrong in, and so enhancing the repeatability of, the molding operation. And in conjunction with the above elimination there is provided a novel operating method or cycle involving retraction of the plunger ahead of the screw, whereby the pressure of the plastic charge is lowered to a point at which it will retain itself in the injection cylinder.

The prior screw type molding machines have been handicapped in that the positioning of the plunger to determine the amount of material to be injected into the mold has been controlled by measuring the pressure developed in the plastic material in a manner which is dependent on or subject to several variables, including friction of the cylinder mechanism, temperature or viscosity of the oil (in the hydraulic system), and the granulation of the plastic material itself. Thus it has heretofore been problematical whether there may be maintained a sufficiently consistent final pressure to produce uniform work.

Under this invention novel method and means are provided for independent or direct and therefore more accurate and reliable measurement and control of the pressure which is developed in the molding material as that is plasticated in the injection chamber. More particularly, the pressure is sensed by direct transmission and with negligible mechanical movement, and so in a manner unaffected by the aforementioned variables.

A further difficulty as to the pressure measurement with at least some types of plastic stock is that the pressure generated in the injection chamber will be affected by the mechanical resistance to flow or shear of the unplasticized material. That is, the material initially will heavily load the mechanism for mechanically working it, herein the motor 38, and that initially significant mechanical resistance will have an axial component artificially raising the chamber or material pressure. The present invention makes provision for controlling the pressure measuring system to differentiate the mechanical resistance load, and so to detect only the true hydraulic pressure in the chamber. Thus the method and apparatus hereof is especially advantageous for use with unpelletized forms of such plastics as polyvinyl chloride, in respect to achieving with these the desired definite and reproduceable volume, pressure and temperature values in the mold charge, and the sought-for repeatability in the operating cycle.

The invention hereof will be better understood from a consideration of the following specification taken in conjunction with the accompanying drawings in which.

Figure 1:
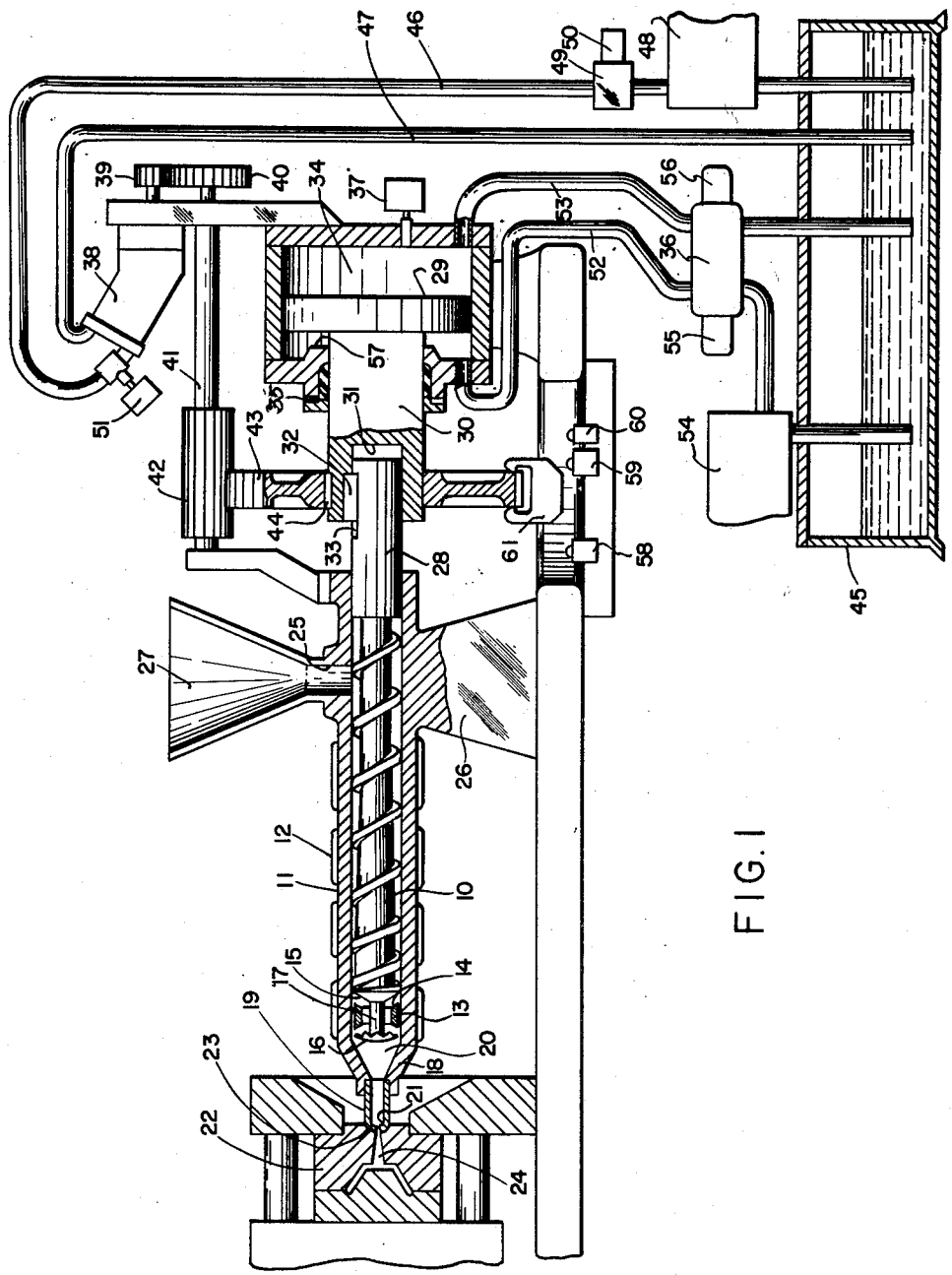
FIG. 1 is a side elevation of an injection molding apparatus embodying the invention and shown partly in vertical axial section and partly in diagrammatic form.

In FIG. 1 is shown a preferred embodiment of the invention apparatus which comprises an elongated screw 10 rotatable and also reciprocable in a sleeve casing 11 having heating units 12 which latter may be conventional. At the forward end of the casing 11 is a ring 13 fitting closely but slidable in the cylinder and having an inclined valve face 14 seatable against and to close the openings in the mating shoulder 15 of the screw 10. The ring 13 is slidable between said shoulder 15 and a spider 16 carried at the end of a stem 17 to which the screw 10 reduces beyond said shoulder 15, and about which the ring 13 has ample clearance. At the forward end the casing 11 reduces as at tapering walls 18 to a tubular neck or nozzle 19 the hollow body of which is comprised in the chamber 20 in which the unit-volume charge or "shot" of the plastic material is prepared for injection into the mold. At its outer end 21 the nozzle 19 is nosed over or rounded and has an opening further reduced for exiting to the mold, here shown as comprising a block 22 having a complementary recess or sprue opening 24 with which the nozzle opening 21 is thereby aligned. As clearly shown in FIG. 1, and as hereinbefore mentioned, the conventional valve means for closing the material chamber 20 is in accordance with the invention entirely omitted from the cylinder or chamber assembly, the nozzle 19 being open always to the mold.

At the rear of its threaded portion the screw 10 is open to a supply passage 25 in a fixed supporting body or housing 26 from which the casing 11 may integrally project, and which carries also a hopper 27 into which the plastic material may be dumped for gravity flow to said passage 25. Behind said housing and hopper the screw 10 has an unthreaded or solid rod extension 28 closing the end of the screw opening in casing 11.

Considering now the means by which the illustrated apparatus is adapted for manipulation in accordance with the invention provision for independent, direct control and measurement of the material pressure and volume. A piston 29 has rigidly or integrally joined to it an axial plunger 30 which is recessed at 31 to telescope over the screw end or rod 28. The piston 29 and plunger 30 are within limits freely shiftable or reciprocable axially relative to the screw 10, being rotatively coupled to it in relatively slidable manner, as by a key 32 anchored in the side or cylinder wall of plunger recess 31 and in an overlong slot 33 in screw rod 28.

Piston 29 is reciprocable and also freely rotatable in a chamber or cylinder 34 closed at one end and made fluid tight at the opposite end through which the plunger 30 enters as by a clamping and sealing ring assembly 35. The arrangement and more particularly the longitudinal or axial extent of chamber 34 is such as to control by the permitted leftward or advancing movement of piston 29 the injection stroke of screw 10, and further to limit the rightward or retracting movement of the piston 29 such that maximum separation of screw 10 and plunger 30 will not withdraw rod 28 from recess 31.

From the foregoing it will be seen that where, as under the loads developed during some phases or periods of operation, the screw 10 and the plunger 30 are closed together, the loads are transmitted through the end face of screw rod 28 and the opposing face of recess 31 of the plunger 30. Thus all heavy thrusts are carried on relatively stationary members, and the pressures to be sensed are developed directly on the piston 29 rather than on mechanical thrust bearings.

In accordance with the invention the pressure developed in material chamber 20 is measured directly, independent of any variables. As just indicated the chamber 20 pressure is expressed directly or proportionately in chamber 34, and more particularly in the chamber portion to the right of piston 29, when that is sealed off, as herein by appropriate positioning of inlet-outlet control or valve means 36. Accordingly, means are provided by the invention for detecting the proportional pressure in chamber 34, a suitable means being herein shown as a pressure sensing switch 37, which may be set or adjusted to respond to pressure rise to selected values, as hereinafter mentioned.

Suitable means are provided by the invention for rotating the screw 10, herein an hydraulic motor 38 having a gear 39 turning gear 40 on a shaft 41 to which is also fixed an elongated gear 42 with which is slidable a gear 43 rotatively coupled by a key 44 to plunger 30, the latter being in turn rotatively coupled by key 32 to rod 28.

The motor 38 is supplied from an hydraulic fluid reservoir 45 to which it is connected through supply and discharge lines 46, 47. A pump 48 is provided in the supply line 46 and is adjusted to control the supply pressure to bring motor 38 to the speed desired. The fluid supply to motor 38 is further controlled by a valve 49 regulated by a solenoid 50, for starting and stopping the rotation of the screw 10 at desired points or intervals.

Further in accordance with the invention, means are provided for positioning the piston 29 to determine the volume of the charge of plastic material, to permit the lowering of the pressure of that plastic charge to a point at which it will maintain itself in the cylinder, and to advance the screw to inject the charge into the mold. Said means comprise fluid lines 52, 53 connecting between the chamber 34 and the reservoir 45, the line 52 going to the one or left side and the line 53 to the other or right side of the piston 29. Hydraulic fluid from the supply in reservoir 45 is forced to the chamber 34 by a pump 54.

The aforementioned valve means 36 is connected as shown in both said lines 52, 53, and is controlled by solenoids 55, 56 for reversing the direction of fluid supply and discharge. More particularly the valve body, which may be of the usual cylinder or spool construction, has an intermediate position to which it is self-centering, and in which both lines 52, 53 are closed; a left position to which it is pushed by the energizing of a solenoid 56; and a right position to which it is pushed by the energizing of a solenoid 55. In the left position of valve 36 the pump 54 is connected in left line 52 for supplying the chamber 34 at the left side of piston 29, and such fluid supplying at the left side will be accompanied by fluid discharge from the right side of piston 29 through line 53 and directly through valve 36 to the reservoir 45. In the right position of valve 36 the pump 54 is crossed through the valve for supplying the chamber 34 through right line 53 at the right side of piston 29, under which reverse flow condition the chamber 34 will discharge from the left side of piston 29 through line 52 as also crossed through valve 36 for fluid return to reservoir 45.

A control means or switch 58 is arranged and connected to initiate a cycle or operation upon completion of the injection stroke. A control means or switch 59 is arranged and connected to position the piston 29 to allow the desired volume of plastic material to be injected into the cylinder 20.

A pressure sensing control means or switch 17 is arranged in chamber 34 to detect rise of the pressure of the desired volume of charge to a predetermined level and the switch 37 is connected thereupon to order the further retraction of piston 29 to allow reduction of that pressure to a level at which the charge will remain in chamber 20 when the mold is open. A control means or switch 60 is arranged and connected to halt said further piston retraction, and thereby to limit the length of the injection stroke, at a point which allows also said pressure reduction.

The switches 58, 59, 60 are supported as convenient, for example on the bed of the machine, for engagement by means, herein the bumper 61 on gear 43, representative of the position and travel of the piston 29.

Figure 2:
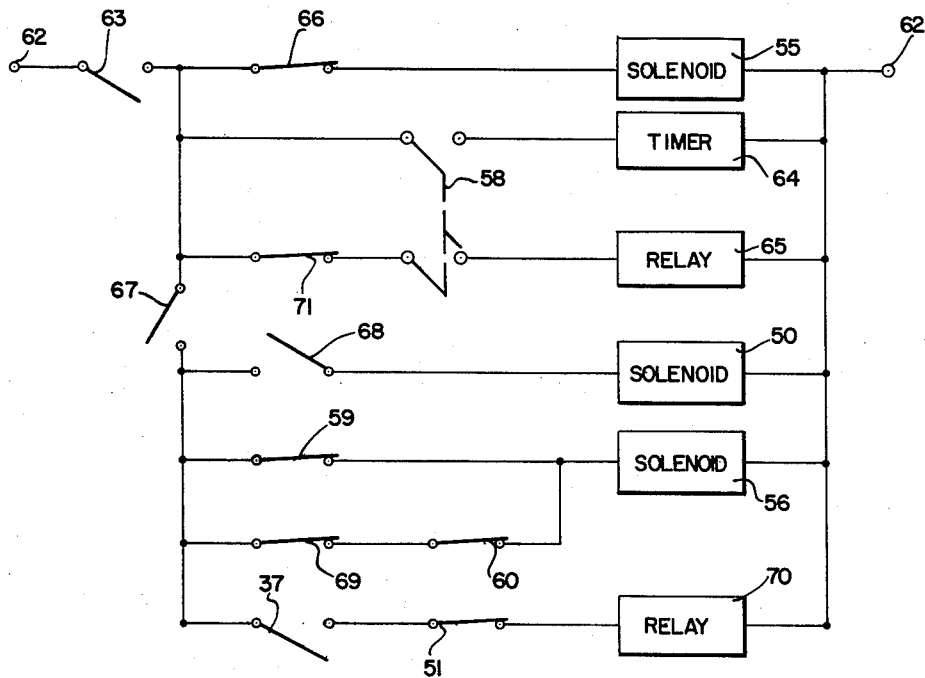
FIG. 2 is a schematic diagram of a control network by which the hydraulic system of FIG. 1 may be regulated to rotate and position the screw and determine the molding volume and pressure in accordance with the invention.

A pressure sensing control means or switch 51 is arranged in line 46 supplying motor 38 to detect the initially high mechanical loading of the screw 10 by some types or forms of plastic material, and is connected as in FIG. 2 to prevent that mechanical load or its axial component from combining with the true hydraulic pressure in chamber 20 as that is sensed in chamber 34.

A representative circuit for connecting the switches 37, 51, 58, 59 and 60 for controlling the motor 38 through solenoid 50 and the piston 29 through solenoids 55, 56 is shown in FIG. 2 as a simplified parallel network comprised in a line connected as at terminals 62 to any suitable or preferred source of power. The circuit as a whole is made or broken by a switch 63 mounted on and for closing and opening with the mold 22.

In the network the solenoid 55 is connected for energizing by the closing of switch 63. The switch 58 is shown as of double pole construction and by its closing to start a timer 64 and energize a relay 65.

Timer 64 is connected by its operation for a set period to open an initially closed switch 66 which cuts power from solenoid 55, and to close an initially open switch 67 which supplies power to solenoid 56. The energizing of relay 65 closes an initially open switch 68 to supply power to solenoid 50, and opens an intially closed switch 69 to break a circuit through switch 60 to solenoid 56, which is also supplied through switch 59, which is initially closed.

Switch 37 is initially open, and is connected by its closing to energize a relay 70 which opens an initially closed switch 71 arranged to de-energize relay 65, and so resupply solenoid 56, so long as switch 60 is closed. Switch 51 is set to open upon excessive load on the motor 38, and so prevent the premature energizing of relay 70 by the closing of switch 37.

In the preparation or set-up of the apparatus the heaters 12 or their pyrometer or other controls are set to heat to and automatically maintain predetermined temperatures, all as understood in the art.

Considering now the operation of the described apparatus in accordance with the invention, the operating cycle may be considered to commence with the closing of the mold 22 following the removal of the article formed therein on the previous cycle, it being understood that one plastic material charge is prepared by the injection apparatus while the previously injected charge is being cured or hardened in the mold. The closing of the mold 22 and thereby switch 63 energizes solenoid 55 to drive valve 36 for fluid supply to the right side of piston 29. The screw 10 is thus forced to the left or advanced to inject the plastic material from the chamber 20 into the mold cavity 24, the screw advance proceeding until halted as by a stop shoulder 57 against which the piston 29 bears in chamber 34. The forward movement of the screw and the material pressure rise induced thereby will produce a relative rearward movement of the ring 13 until its face 14 is seated against the screw shoulder 15, and so insure injection of the full measured volume by sealing the chamber 20 against escape of the plastic through the screw passages.

The described advancing or injection movement of piston 29 and with it screw 10 advances also bumper 61 to shift left or close double pole switch 58, and thereby to start timer 64 and energize relay 65. The locating of the limit switch 58 may be such as to cause its engagement or actuation by the bumper 61 sufficiently in advance of the mechanical halting of the piston 29 by the stop 57 to insure consistent operation regardless of expected variation in the operating stroke of the switch 58, or of other tolerances as required of or inherent in a practical machine.

In accordance with the invention the timer 63 is adjusted or set to run for any desired period or time of dwell or pressure hold, during which piston 29 remains held in the advanced position, under the pressure of pump 54 as that is applied against piston 29 in chamber 34. During this pressure hold any shrinkage of the material in the cavity of mold 22 may be made up from the material still under pressure in chamber 20, due to the aforementioned pressure in chamber 34 and also to its own elasticity, and so long as stop 57 has not been reached by piston 29. The length of the period of dwell or pressure hold is also such as to permit the material in sprue opening 24 to harden at least partially. It will be determined generally by the nature of the plastic material in use, the nature of the mold in use, and other particulars of the molding operation in use, as will be understood by those skilled in the art.

Upon completion of its set period of operation, the timer 64 opens initially closed valve 66 to deenergize solenoid 55, and closes initially open switch 67 to energize solenoid 56. This shifts valve spool 36 to reverse the direction of fluid flow in lines 52, 53 and so thereby drive piston 29 rearwardly or to the right. In this retraction the piston 29 is not necessarily followed by screw 10 because of the sliding engagement of screw rod 28 in plunger recess 31, and of key 32 in recess 33.

But the aforementioned energizing of relay 65 will have closed initially open switch 68 and opened initially closed switch 69. When the closing of switch 68 is followed by the closing of switch 67 a circuit is completed through solenoid 50, which opens valve 49 and allows pump 48 to drive motor 38 which in turn rotates the screw 10, through its aforementioned gear train. In this initiating of the preparation of the fresh charge the plastic material is drawn from hopper 27 and worked forward in the screw passages as well understood in the art. The valve ring 13 will be forced away from screw 10 by the pressure of the plastic material, which material pressure exceeds that in chamber 20 by reason of the retraction of screw 10. Since the plastic material is prevented from escaping through the nozzle 19 by the filled condition of the mold cavity 22 and the hardening of the plastic material there and in the sprue 24, the accumulating of it in chamber 20 will eventually compel the rearward movement of the screw 10, which it is free to undergo, by reason of the prior retraction of piston 29.

Thus in retracting the screw 10 at its end 28 may or may not be in contact with the opposing end face of recess 31, as the specific conditions obtaining in the particular molding operation may dictate. In any event the charging of the chamber 20 will be such as to fill it completely with the plasticized material, so that air and also any possible gaseous products of the plasticating process are excluded therefrom.

The retraction of piston 29 responsive to the closing by timer 64 of valve 67 to energize solenoid 56, continues until bumper 61 is brought into engagement with and opens initially closed switch 59. This breaks the circuit through solenoid 56 which becomes de-energized along with solenoid 55. Valve 36 then centers itself and chamber 34 is sealed off.

The period required for retraction of the piston 29 and plunger 30 to this first retracted control position is determined by the speed of motor 38, which is controlled by adjustment of the pump 48 in any desired manner. The rotation of screw 10 and the supply thereby of the plastic material to the chamber 20 continues through this period and during and after the rearward forcing thereby of screw 10 until stopped by seating of its end 28 in plunger recess 31. The continuing of the plastic material supply after the screw 10 is halted as described, in the predetermined charge volume fixing position in which the piston 29 is held by the relatively incompressible fluid volume sealed in the chamber 34 portion to the right thereof, will raise the chamber 20 pressure to complete the plasticating of the material and eventually to produce a pressure rise in chamber 34 such as closes initially open pressure sensing switch 37. If as will be assumed the switch 51 is closed this described closing of switch 37 will energize relay 70 which is connected to open initially closed switch 71, thereby breaking the circuit through and so de-energizing relay 65. This returns switches 68 and 69 to their original open and closed positions, removes power from solenoid 50 to stop motor 38, and restores power to solenoid 56 to further retract piston 29.

This further retraction of piston 29 continues until it reaches a second retracted control position as determined by limit switch 60, the actuation of which by bumper 61 will be seen again to remove power from solenoid chamber 34. This second additionally retracted control position of piston 29 is predeterminedly such as to permit the material chamber 20 an increased volume in which the pressure of the plastic material is substantially reduced, and more particularly lowered to a point at which the material will not escape through the open nozzle 19. It is found that this can be done with all plastic materials without disrupting or destroying the initial control or adjustment of the charge to the preparation volume, pressure and temperature conditions which are appropriate to the particular plastic material. Thus the elastic pressure of the plastic material in the chamber 20 will cause screw 10 to follow the further rightward movement of piston 29 until the elastic energy stored in the material is used up, whereupon the screw will stop, in a position which may or may not have its rod 28 end engaged against the end face of plunger recess 31.

All of the foregoing will be understood to take place within the cooling or curing time normally required for the shot injected into the mold at the commencement of the cycle, and which shot is now removed and the mold reclosed in preparation for the commencement of the next cycle. The mold may be opened by timing equipment forming part of the mold operating mechanism, and the mold may be reclosed either automatically or by its manipulation by the operator.

Switch 51 is a normally closed switch set to open subject to excessive pressure in line 46, and so to prevent premature energizing of relay 70 to stop the rotation of the screw. Such excessive pressure may result from the characteristic which some plastic materials have of heavily loading initially any mechanism which attempts to work them mechanically and then losing their resistance to such working, especially if they are thereby also moved into a region of higher temperature. In machine of the type here described such materials have the effect of first loading the motor 38 heavily requiring the rise of the pressure from pump 48 to relatively high levels. Then, as the rate of intake of fresh material from the hopper decreases and the material present in the screw passages becomes plasticated, the load on motor 38 and with it the pressure on pump 48 will be allowed to fall to lower levels. As hereinbefore pointed out, with materials possessing the characteristic in question the mechanical load on the screw 10 may have an axial component sufficient to affect significantly the pressure in chamber 34. But when the circuit through the pressure responsive switch 37 is completed only as the pressure at switch 51 is below a level reflecting the mechanical load, the initial rise in the pressure as felt in chamber 34 to the level at which switch 37 is set to close will not energize relay 66. The pressure in chamber 34 will then fall below the set point and so reopen switch 37. Subsequently switch 51 will reclose responsive to the reduction in the load on motor 38. So that when still later the pressure in chamber 34 again rises to the level at which switch 37 is set to close, that will have the desired effect of energizing relay 65 to stop the rotation of the screw 10 and initiate the further retraction of the piston 29 as already described.

My invention is not limited to the particular embodiment thereof illustrated and described herein, and I set forth its scope in my following claims.

I claim:

1. The method of manipulating an injection molding machine of the type having a screw rotatable and slidable in a cylinder fitted with an open nozzle following one and in preparation of the next injection of the plastic charge into the mold, which comprises positioning said nozzle against the mold to establish in said cylinder and between said mold and said screw a predetermined charge preparing chamber volume, feeding plastic material to said screw and rotating it while heating said cylinder to deliver the plastic material to said chamber at a predetermined charge preparing temperature, stopping the rearward movement of said screw compelled by delivery of said material when said chamber has reached said predetermined volume, continuing the rotation of said screw while holding it against further retraction to bring the plastic material in said chamber volume to a predetermined charge pressure, thereupon stopping rotation of and allowing retraction of said screw a predetermined amount to increase the chamber volume and decrease the material pressure to a point at which that will not flow out through the nozzle when the mold is opened to remove the article molded from the previous charge, and upon the reclosing of said mold advancing said screw to force said material out of said chamber and into said mold under desired pressure and temperature.

2. In a rotating reciprocating screw injection molding apparatus having a material injection chamber ahead of the screw and a material supply in communication with the screw, means for rotating the screw to deliver material from said supply to said chamber, means for heating the apparatus to bring said material to a predetermined temperature in said chamber, means for adjustably limiting the retraction of said screw under delivery of said material whereby said delivery is to a chamber of predetermined volume, means for detecting the filling of said chamber to raise said material to a predetermined pressure and thereupon stopping said rotation of said screw, and means for thereafter advancing said screw to inject the material into a mold, said screw retraction-limiting and advancing means comprising an hydraulic control system including a piston and means for advancing and retracting said piston relative to said chamber, said piston being slidably connected to said screw and retracted to its screw-retraction-limiting position independently of said screw whereby the screw retraction is only with and under pressure of the material delivery.

3. Injection molding apparatus comprising a cylinder terminating in an open nozzle adapted to be applied to a mold, a screw rotatable and slidable in said cylinder, reciprocable means for positioning and advancing said screw in said cylinder, said reciprocable means operable to advance said screw for injecting said material into said plastic mold and adapted to be positioned to define in said cylinder ahead of said screw and between the screw and said mold a plastic material supply chamber of predetermined charge volume, means for rotating said screw to advance plastic material into said supply chamber while allowing said screw a rearward movement as forced by the filling of said supply chamber with said plastic material, means for halting said rearward movement of said screw when said supply chamber has reached said predetermined charge volume while allowing continuing rotation of said screw to increase the pressure of said plastic material, means for detecting said increasing pressure of said plastic material against said halted screw, means for stopping said screw rotation when said material has reached a predetermined charge pressure, means for concurrently heating the material to a predetermined temperature, and means for retracting said reciprocable means to allow retraction of said screw under pressure of said material for reducing of said pressure to a non-flowing level and thereafter advancing the reciprocable means and by it said screw to reestablish definite and reproducing pressure and volume and temperature values in said material and then force it from said chamber and for injection into said mold.

4. In the operation of a plastic injection molding machine of the class having a cylinder, an open nozzle exiting from said cylinder and for application to a mold, and a rotary screw reciprocating in said cylinder and in communication with a supply of the plastic material, the steps of rotating said screw while heating said cylinder to deliver said material at a predetermined temperature, holding said nozzle to a mold while limit-stopping the rearward movement of said screw compelled by said material during said delivery and whereby to define in said cylinder and between said nozzle and mold a material-holding chamber of predetermined volume, continuing the rotation of said screw while limit-stopped until it has filled said chamber to a predetermined material pressure, allowing retraction of said screw under said material pressure and to lower said pressure to a point at which the material will not escape through said nozzle when said mold is opened, and when the mold is reclosed advancing the screw to inject the material under definite and reproducible volume, pressure, and temperature.

5. The method of charging a mold with plastic material of closely controlled pressure, temperature and volume with a rotating-reciprocating screw apparatus having a casing defining ahead of the screw a chamber which is open to the mold which comprises closing the mold, advancing the screw to ram a charge into the mold, while the mold remains closed rotating the screw and heating the casing to deliver a succeeding charge to said chamber at a predetermined temperature, adjusting the chamber to a predetermined volume by halting the rearward movement of said screw compelled by the delivery of said charge to said chamber, continuing the rotating of said screw and thereby the delivery of said charge to said chamber while maintaining said screw in reciprocating position limiting said chamber to said predetermined volume and whereby to raise said charge to a predetermined pressure, opening the mold and removing the article molded from the rammed charge while concurrently releasing said halted screw for movement further rearwardly under the elastic pressure of the succeeding charge to increase the volume of the chamber and thereby lower the pressure of said charge to a point at which the material thereof is non-flowing, and then reclosing the mold and advancing the screw to inject the succeeding charge at desired volume, pressure, and temperature as determined by the initial preparation of the charge.

6. In a rotating reciprocating screw injection molding apparatus having a material injection chamber ahead of the screw and a material supply in communication with the screw, means for rotating the screw to deliver material from said supply to said chamber, means for heating the apparatus to bring said material to a predetermined temperature in said chamber, means for halting the retraction of said screw compelled by delivery of said material whereby to adjustably limit said chamber to a predetermined volume, means for sensing the increasing pressure of said delivered material against said halted screw and for stopping said rotation of said screw when said material is raised to a predetermined pressure, means for thereafter advancing said screw to inject the material into a mold, said screw retraction-limiting and advancing means comprising an hydraulic control system including a piston and means for advancing and retracting said piston relative to said chamber, and valve means between said screw and chamber and automatically closing upon said screw advance to seal against escape from said predetermined volume chamber of any of said predetermined pressure material.

7. In a rotating reciprocating screw injection molding apparatus having a material injection chamber ahead of the screw and a material supply in communication with the screw, means for rotating the screw to deliver material from said supply to said chamber, means for heating the apparatus to bring said material to a predetermined temperature in said chamber, means for halting the retraction of said rotating screw which is compelled by delivery of said material whereby to adjustably limit said chamber to a predetermined volume, means for sensing the increasing pressure against said halted screw of the material delivered by the continuing rotation of said screw, means for stopping said rotation of said screw when said material is raised to a predetermined pressure, means for thereafter advancing said screw to inject the material into a mold, and means for rendering said pressure sensing means inoperative when the mechanical load on said rotating screw of said material delivering to said chamber is sufficient to affect the retracting pressure on said screw of said material delivered to said chamber.

References Cited in the file of this patent

UNITED STATES PATENTS

| | | |
|---|---|---|
| 2,734,226 | Willert | Feb. 14, 1956 |
| 2,916,769 | Baigent | Dec. 15, 1959 |
| 3,001,233 | Ernst | Sept. 26, 1961 |

FOREIGN PATENTS

| | | |
|---|---|---|
| 230,910 | Australia | Nov. 1, 1960 |
| 581,229 | Italy | Aug. 23, 1958 |